UNITED STATES PATENT OFFICE.

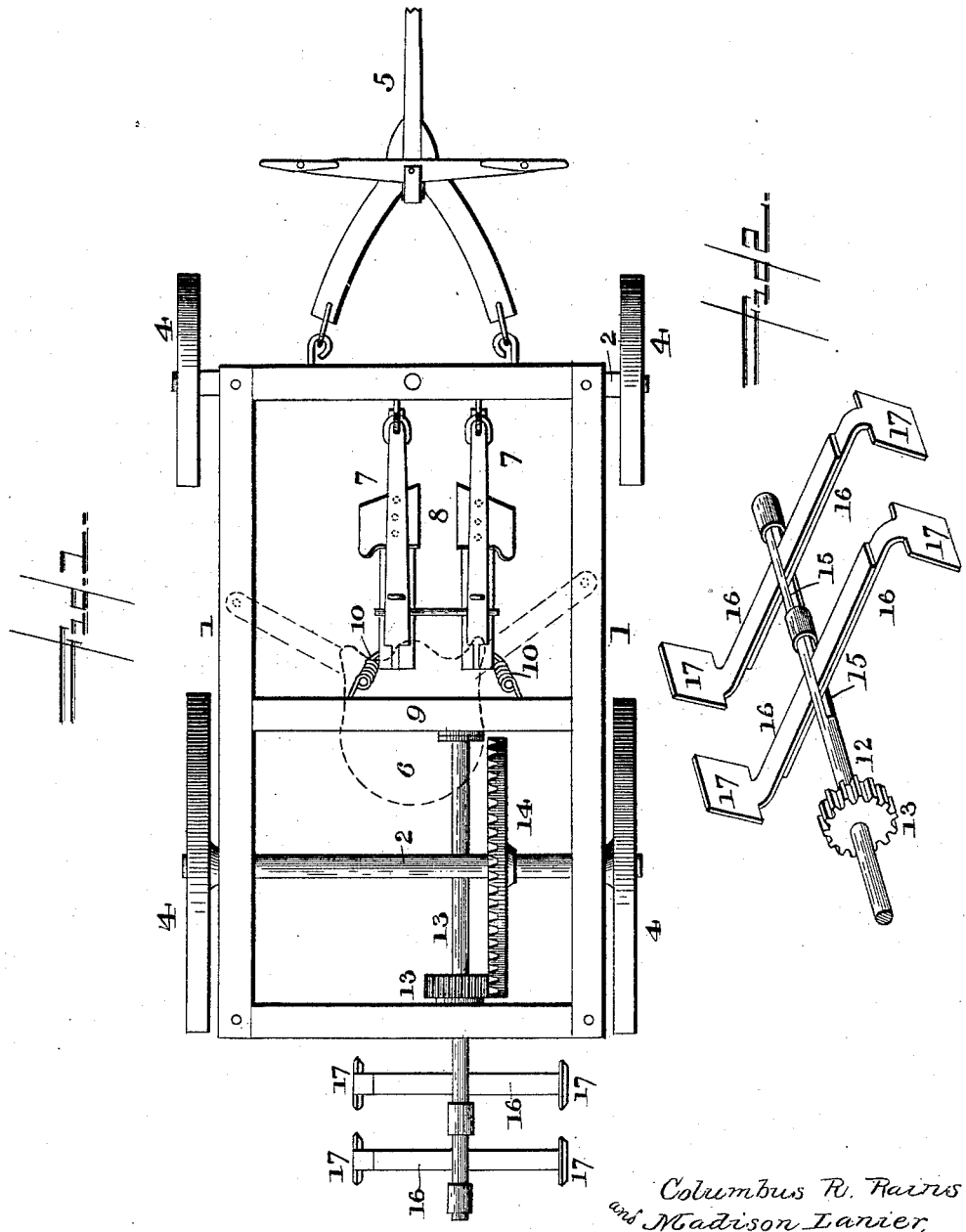

COLUMBUS R. RAINS AND MADISON LANIER, OF CARTER, TEXAS.

COMBINED COTTON CHOPPER AND CULTIVATOR.

SPECIFICATION forming part of Letters Patent No. 465,143, dated December 15, 1891.

Application filed April 8, 1891. Serial No. 388,124. (No model.)

*To all whom it may concern:*

Be it known that we, COLUMBUS R. RAINS and MADISON LANIER, both residents of Carter, in the county of Parker and State of Texas, have invented certain new and useful Improvements in Combined Cotton Choppers and Cultivators; and we do hereby declare that the following is a full, clear, and exact description of the invention, which will enable others skilled in the art to which it appertains to make and use the same, reference being had to the accompanying drawings, which form a part of this specification.

Our invention relates to improvements in combined cotton choppers and cultivators, the object being to improve the construction of the chopper-hoes, so that they can be readily adjusted on the revolving shaft by which they are carried, so as to vary their stroke or the distance from said shaft.

The invention consists in the novel construction and combination of parts hereinafter fully described, and specifically defined in the claims.

In the accompanying drawings, Figure 1 is a plan view of a cotton-chopper constructed in accordance with our invention. Fig. 2 is a detail view of the end of the chopper-shaft.

In the said drawings, the reference-numeral 1 designates the frame of the machine supported by the axles 2, which are provided with wheels 4. The front axle is provided with an ordinary tongue 5, and a seat 6 is mounted on the frame 1. Connected to the front cross-bars of the frame are drag-bars 7, which are provided with shovels 8. The rear ends of these drag-bars are connected to middle transverse bar 9 by means of coiled springs 10.

The numeral 12 designates the chopper-shaft, journaled in the rear and middle cross-bars and extending beyond the rear of the machine. Intermediate of its ends this shaft is provided with a pinion 13, which meshes with a crown-wheel 14, secured to the rear axle. The rear end of the revolving bar is provided with a longitudinal slot or opening 15, through which passes the arms 16, carrying the hoes or choppers 17.

In placing the chopper-arms in the chopper-shaft the arms are inserted in the slot 15 from opposite sides of the shaft, so that they will be in contact with and bear against each other and are held in said slot by frictional contact. These arms can thus be readily adjusted to and from the shaft, so as to vary their stroke.

Having thus described our invention, what we claim is—

In a cotton chopper and cultivator, the combination, with the frame, the axles and wheels, the shovels, and the crown-wheel on the rear axle, of the chopper-shaft journaled in the frame having a pinion meshing with the crown-wheel and a slot near its outer end, and the adjustable chopper-arms passing through said slot in frictional contact therewith and with each other, substantially as described.

In testimony that we claim the foregoing as our own we have hereunto affixed our signatures in presence of two witnesses.

COLUMBUS R. RAINS.
    MADISON LANIER.

Witnesses:
 A. L. LINDSEY,
 J. M. GRAHAM.